United States Patent

Teraura et al.

[11] Patent Number: 6,079,619
[45] Date of Patent: Jun. 27, 2000

[54] IDENTIFICATION TAG FOR WIRELESS COMMUNICATION WITH REMOTE CONTROLLER

[75] Inventors: Nobuyuki Teraura, Tokai; Hiroyoshi Takeuchi, Hoi-gun; Masatoshi Yamauchi, Nagoya, all of Japan

[73] Assignee: Denso Corporation, Kariya, Japan

[21] Appl. No.: 09/126,815

[22] Filed: Jul. 31, 1998

[30]  Foreign Application Priority Data

Aug. 5, 1997  [JP]  Japan ..................................... 9-224279
Mar. 10, 1998 [JP]  Japan .................................. 10-058069

[51] Int. Cl.[7] .................................................. G06K 07/10
[52] U.S. Cl. ........................ 235/380; 235/382.5; 235/492
[58] Field of Search ..................................... 235/380, 382, 235/382.5, 492

[56]  References Cited

U.S. PATENT DOCUMENTS 5,113,184  5/1992  Katayama ............................. 235/382.5
5,247,305  9/1993  Hirata et al. .
5,378,887  1/1995  Kobayashi ............................... 235/492
5,471,203  11/1995 Sasaki et al. ............................ 235/382
5,804,810  9/1998  Woolley et al. ......................... 235/492

FOREIGN PATENT DOCUMENTS 5-2272  1/1993  Japan .

Primary Examiner—Donald Hajec
Assistant Examiner—Mark Tremblay
Attorney, Agent, or Firm—Pillsbury Madison & Sutro, LLP.

[57]  ABSTRACT

An identification tag is attached to or imbedded in each article a plurality of which are located nearby or stacked together. The identification tag wirelessly communicates with a remote controller such as a hand-held terminal to send data or receive command. Electric power to operate the identification card is also wirelessly supplied from the remote controller. The electric power is received only by a particular identification card which is communicating with the remote controller, and is turned off when the communication is completed. The electric power is then supplied to the next identification card which communicates with the remote controller. Thus, all the identification tags sequentially send data thereof one by one to the remote controller. The remote controller includes an indicator that indicates whether the communication with all the identification tags is completed, so that the remote controller can be positioned at a right place until the end of the communication.

14 Claims, 7 Drawing Sheets

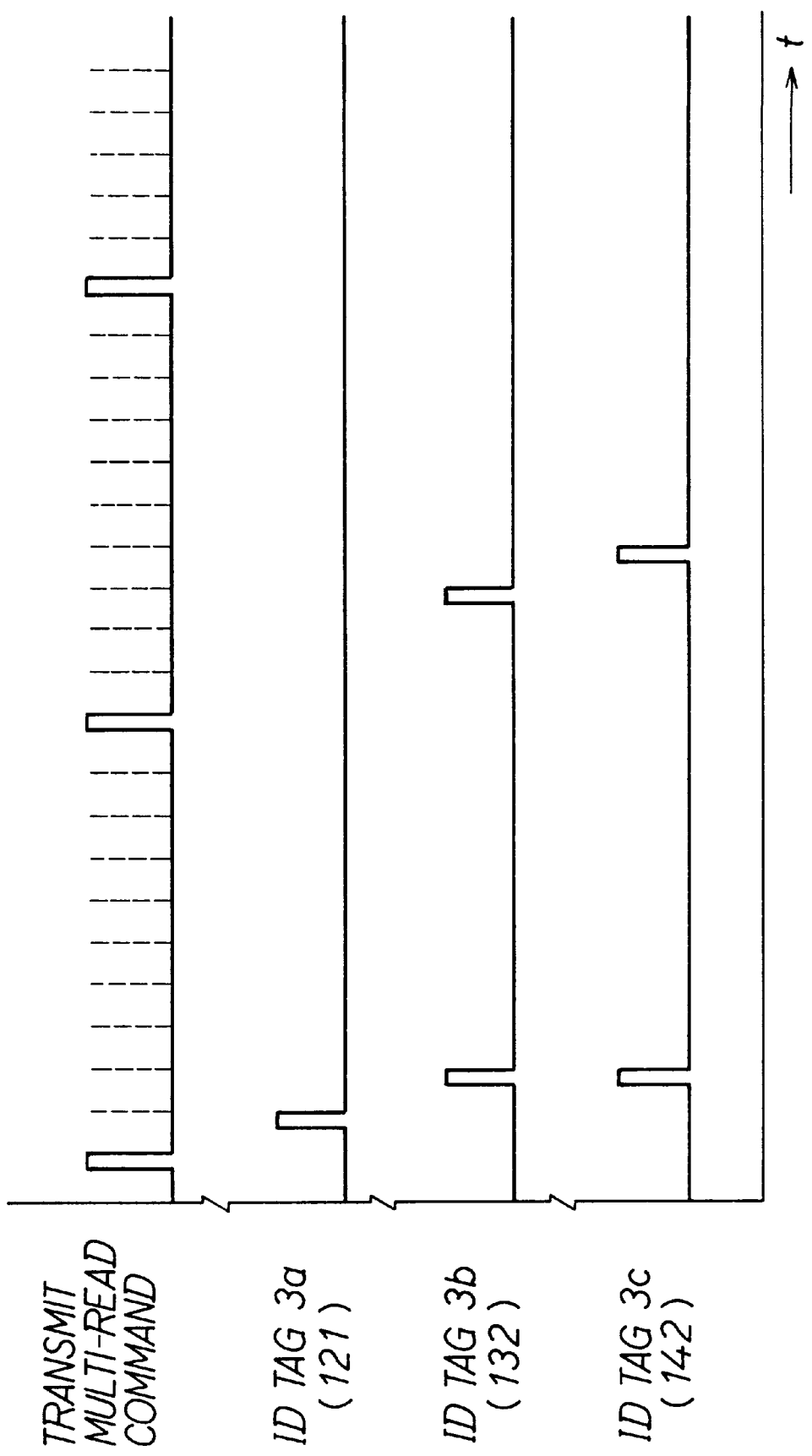

IDENTIFICATION TAG FOR WIRELESS COMMUNICATION WITH REMOTE CONTROLLER

CROSS-REFERENCE TO RELATED APPLICATIONS

This application is based upon and claims benefit of priority of Japanese Patent Applications No. Hei-9-224279 filed on Aug. 5, 1997, and No. Hei-10-58069 filed on Mar. 10, 1998, the contents of which are incorporated herein by reference.

BACKGROUND OF THE INVENTION

1. Field of the Invention

The present invention relates to an identification tag (ID-tag) for wirelessly communicating with a remote controller, to which electric power is wirelessly supplied from the remote controller. The remote controller is, for example, a portable reader-writer.

2. Description of Related Art

A radio communication system using high frequency wave between a remote controller and an ID-tag carried by a moving body has been known hitherto. In this system, data stored in the ID-tag are read and data are written on the ID-tag through wireless communication between the ID-tag and the remote controller. The ID-tag includes a modulator-demodulator for transmitting and receiving data, a memory and a microprocessor unit for controlling communication. Usually, the ID-tag also includes a power source such as a battery. If a battery is used as a power source, life of the battery determines the life of the ID-tag, i.e., the ID-tag cannot be used anymore when the battery power is used up.

To solve the problem of battery life, a system in which power is wirelessly supplied from an outside source such as a remote controller has been in use recently. In this system, the ID-tag includes a resonant circuit consisting of an antenna coil and a condenser. Power is received by the resonant circuit as alternating current power, and then it is rectified by a rectifier included in the ID-tag. This kind of ID-tag is attached to an article such as a pallet carrying parts on a conveyer of a manufacturing line or a package sequentially transported in a depot. Since these articles are transported sequentially one by one, electric power to operate the ID-tag can be effectively supplied to the ID-tag form the remote controller. However, if the articles each having the ID-tag are stacked together, electric power cannot be supplied to all the ID-tags, because ID-tags located close to an ID-tag to which electric power is being supplied cannot receive electric power. This is because electric current flowing in the resonant circuit in the ID-tag which receives electric power from the remote controller functions to cancel radio wave which is to be supplied to other ID-tags located nearby.

In addition, when a portable reader-writer such as a hand-held terminal is used as the remote controller, it is necessary to keep the portable reader-writer at a same position until communication with all the stacked articles is completed.

SUMMARY OF THE INVENTION

The present invention has been made in view of the above-mentioned problems, and an object of the present invention is to provide an ID-tag which does not receive electric power or receives only a small amount of power after it completes communication with a remote controller so that other tags located nearby can receive electric power from the remote controller. Another object of the present invention is to provide a remote controller which communicates with the ID-tag, which is able to indicate whether the communication with all the ID-tags stacked together is completed, so that the remote controller such as a hand-held terminal can be held at a right position until the end of the communication.

An ID-tag is embedded in or attached to each article, a plurality of which are placed nearby or stacked together. Electric power for operating each ID-tag is wirelessly supplied to the ID-tag from a remote controller such as a hand-held terminal. The ID-tag communicates wirelessly with the remote controller for sending and receiving data and other information. The ID tag includes an antenna such as a coil antenna for receiving the power supply and for the data communication. The antenna is connected to a condenser in series, thereby forming a resonant circuit for receiving the power supply.

The data stored in the ID-tag are read by the remote controller under a multi-read mode. Each ID-tag communicates with the remote controller sequentially one by one. The electric power from the remote controller is supplied to the first ID-tag and the communication under the multi-read mode starts. When the communication with the first ID-tag is completed, i.e., the data stored in the ID-tag are all read, the power supply to the first ID-tag is terminated, and the power is supplied to the second ID-tag and data stored in the second ID-tag are read by the remote controller. This process continues until all the ID-tags located in the communication area finish the communication with the remote controller. A switching member such as a relay or a semiconductor element is connected in series with the resonant circuit. The switching member turns on or of f the resonant circuit to control the power supply. When the switching member turns off the resonant circuit, it is kept turned off for a predetermined period of time. The resonant circuit may not be completely turned off, instead, an impedance of the resonant circuit may be increased to limit the power supply to such a level that does not interfere with the power supply to other ID-tags placed nearby.

The remote controller such as a hand-held terminal indicates the fact that it is communicating with the ID-tags by giving off a beep sound or displaying such an indication on a display window. This indication continues until the communication with all the ID-tags is completed. An attendant holding the remote controller is notified whether the communication is completed, so that the attendant can hold the remote controller at a right position until the end of the communication.

Other objects and features of the present invention will become more readily apparent from a better understanding of the preferred embodiments described below with reference to the following drawings.

BRIEF DESCRIPTION OF THE DRAWINGS

FIG. 11 is a time chart showing communication timing under a multi-read mode.

DETAILED DESCRIPTION OF THE PREFERRED EMBODIMENTS

A first embodiment of the present invention will be described referring to FIGS. 1–5. One application of the ID-tag as the first embodiment will be described, taking a billing system in a rotary "sushi" bar.

A rotary conveyer carrying sushi dishes thereon is installed in the sushi bar. The conveyer transports sushi dishes each carrying a respective kind of sushi thereon. Customers sit around the rotary conveyer and take dishes whichever they like and stack up the vacant dishes after they have eaten the sushi. The sushi dishes are differently colored or designed according to kinds of sushi, e.g., a dish colored with a certain color carries a kind of sushi, and dish with another color carries another kind of sushi, so that the dish color indicates a price of sushi placed on the particular dish. A bill of the sushi bar is calculated according to the number of dishes and the color of respective dishes. The ID-tag of the present invention is used for automatically counting the bill in such a sushi bar.

Figure 1:
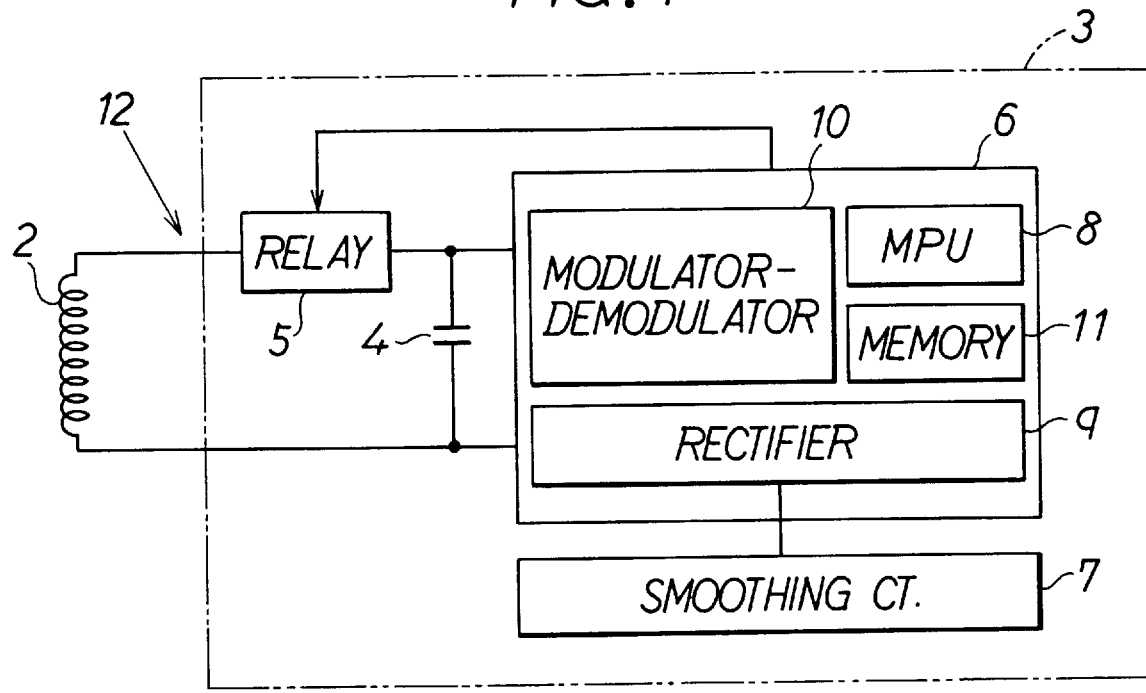
FIG. 1 is a block diagram showing circuits and components contained in an ID-tag, as a first embodiment according to the present invention.
Figure 2:
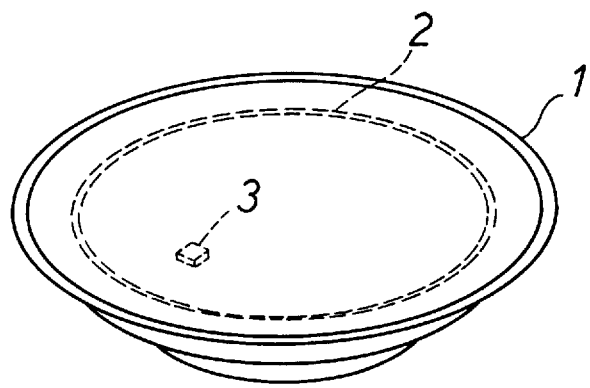
FIG. 2 is a perspective view showing a "sushi" dish in which an ID-tag and a coil antenna are embedded.

As shown in FIG. 2, an ID-tag 3 and a coil antenna 2 are embedded in a shushi dish 1 made of plastic resin such as melanin resin. As shown in FIG. 1, the ID-tag 3 includes electronic components and circuits consisting of a condenser 4, relay 5, an integrated circuit chip (ID chip) 6 and a smoothing circuit 7, all of which are mounted on a printed board. The relay 5 is a switching element such as a photo-MOS relay, solid state relay (SSR) or the like. The ID chip 6 includes a microprocessor unit (MPU) 8, a rectifier 9, a modulator-demodulator 10, a memory 11. The smoothing circuit 7 includes a smoothing condenser and a Zener diode.

The condenser 4 is connected to the antenna coil 2 thereby forming a resonant circuit 12. The relay 5 which is normally ON is connected in the resonant circuit 12 in series. The antenna coil 2 catches radio frequency sent from a remote controller such as a portable reader-writer. The alternating current in the resonant circuit 12 is rectified by the rectifier 9 into direct current power and smoothed by the smoothing circuit 7. The smoothing circuit 7 supplies direct current power with a predetermined voltage level to the MPU 8 and other components. Signals such as commands and data sent from the remote controller are superimposed on the radio wave for power supply. The signals are demodulated by the modulator-demodulator 10 and fed to the MPU 8. The MPU 8, which operates according to a program stored in a read-only-memory (ROM) of the memory 11, processes the signals demodulated by the modulator-demodulator 10 and writes data received from the remote controller on an erasable non-volatile memory such as an EEPROM contained in the memory 11. The data stored in the memory 11 are read out by the MPU 8 and fed to the modulator-demodulator 10 which in turn modulates the data to transmit them from the antenna coil 2 in a form of radio wave.

Figure 3:
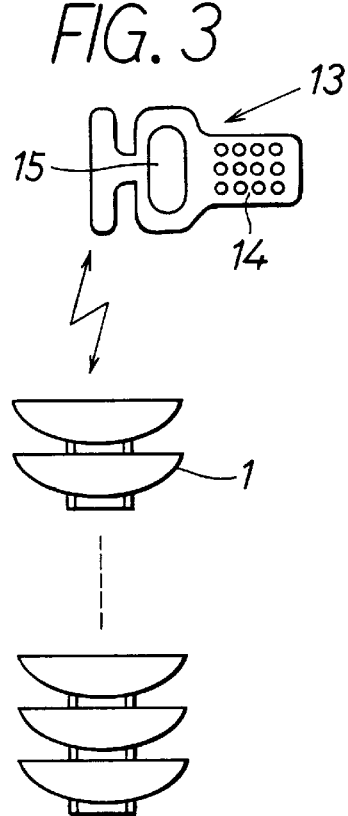
FIG. 3 is a schematic view showing a portable reader-writer communicating with the sushi dishes stacked together.

The ID-tag 3 described above communicates with a stationary controller installed at a side of the conveyer and a portable reader-writer 13 shown in FIG. 3. The stationary controller communicates with the ID-tag 3 embedded in the sushi dish 1 to send or receive data concerning prices of sushi, kinds of sushi, time the sushi was made, the number of turns of the conveyer On which a particular dish is carried without being taken by a customer, and so on. The sushi dishes 1 which have been circulated on the conveyer in excess of predetermined turns will be unloaded from the conveyer.

Figure 4:
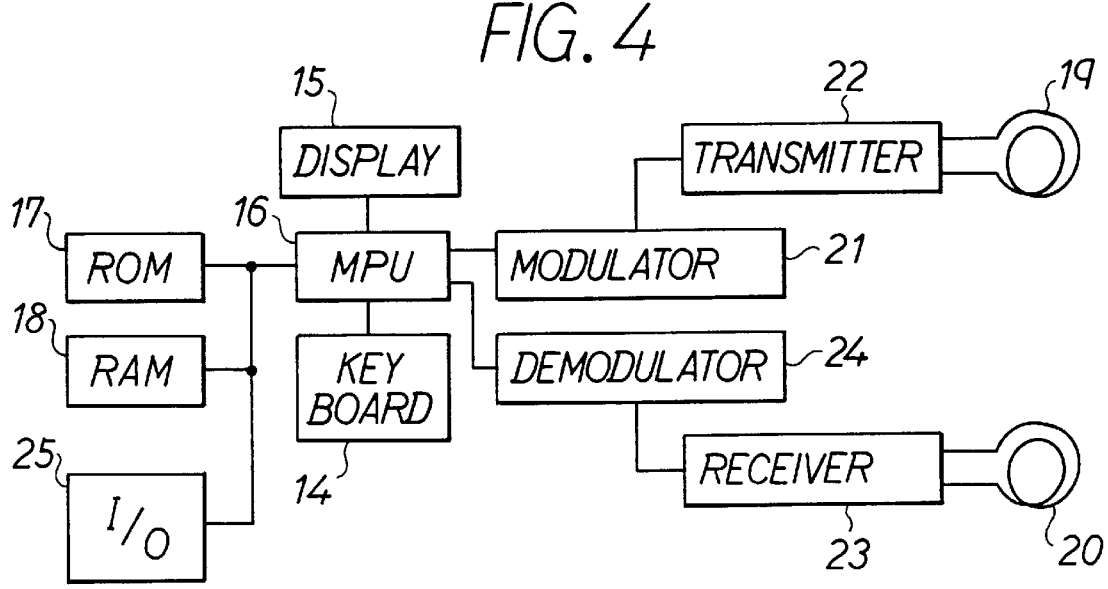
FIG. 4 is a block diagram showing electronic circuits contained in the portable reader-writer.
Figure 5:
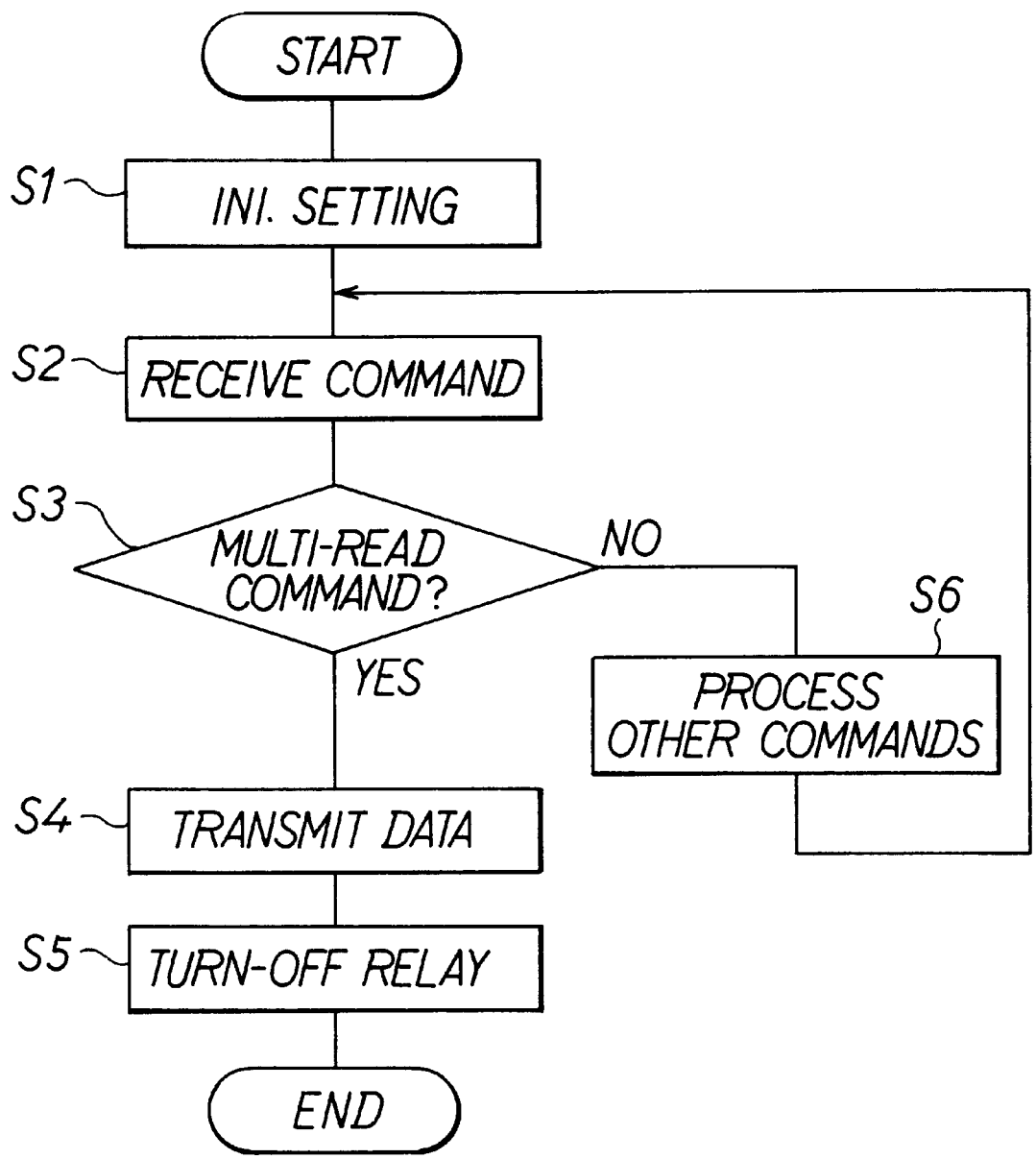
FIG. 5 is a flowchart showing a communication process between the ID-tag and the portable reader-writer.

The portable reader-writer 13 shown in FIG. 3 communicates with the ID-tag to count the number of dishes 1 stacked at a side of a customer and to calculate an amount of a bill to be paid. The portable reader-writer 13 includes a battery for supplying operating power, a keyboard 14, a display window 15 and antennas for communication. As shown in FIG. 4, the portable reader-writer 13 contains electronic components therein such as an MPU 16 for controlling a whole operation, a ROM 17 and a RAM 18. The MPU 16, upon receipt of commands and signals form the keyboard 14, performs its function according to a program stored in the ROM 17. The commands, data fed from the keyboard 14, the amount of a bill and other information are displayed on the display window 15.

A transmitting antenna 19 and a receiving antenna 20 are installed in the portable reader-writer 13. To communicate with the ID-tag embedded in the dish 1, a modulator 21 modulates only a carrier signal, and then the signal is sent from a transmitter 22 through the antenna 19 as a radio wave for supplying power to the ID-tag 3. Then, the MPU reads out data to be transmitted from the RAM 18, and the data are modulated by the modulator 21 so that they are superimposed on the radio wave for power supply. Then, the superimposed wave is sent out from the transmitting antenna 19. On the other hand, radio signals sent from the ID-tag 3 are received by a receiver 23 through the receiving antenna 20 and demodulated by a demodulator 24 into data. Under control of the MPU 16, the data from the demodulator 24 are stored in the RAM 18, and the MPU 16 calculates the amount of bill which in turn are displayed on the display window 15. The portable reader-writer 13 also includes an I/O 25 for communicating with the stationary controller.

To calculate an amount of the bill corresponding to the sushi dishes stacked at a side of a customer after he (or she) has finished the meal, an attendant carries the portable reader-writer 13 to a position close to the stacked dishes 1 and operates the keyboard 14 to start the communication process. First, a radio wave for supplying power to the ID-tag 3 is transmitted, and then a command signal superimposed on the radio wave for power supply is sent to the ID-tag 3. The radio wave for power supply received by the coil antenna 2 of the resonant circuit 12 is rectified and smoothed into direct current power having a predetermined constant voltage by the rectifier 9 and the smoothing circuit 7. The direct current power thus obtained is used as a power source for operating the ID-tag 3. Details of the communication process will be explained referring to a flowchart shown in FIG. 5. Upon receipt of the DC power, the ID-tag 3 begins its operation. An initial condition is set at step S1, and then the command sent from the portable reader-writer 13 is fed at step S2. At step S3, whether the command received is a multi-read command or not is judged. The multi-read command means a command to read data on all of the dishes 1 stacked. Besides the multi-read command, a single-read command and a single-write command are also used in communication in this system. The single-read command is used, for example, in the communication between the stationary controller and a single ID-tag 3 to read data on the particular ID-tag 3. The single-write command is used, for example, to write data on an ID-tag one by one moving on the conveyer by sending signals from the stationary controller to the ID-tag 3. Since the multi-read command is used here to read data on all of the stacked dishes 1, the kind of the command received by the ID-tag is judged at step S3.

If the command is judged as the multi-read command at step S3, then the data on the ID-tag 3 are transmitted to the portable reader-writer 13 at step S4. The data include an identification number of a particular dish 1 and a kind of the dish. The radio wave for supplying power to the ID-tag is an high frequency wave having a narrow directivity and has an intensity which is able to supply power to two or three dishes simultaneously. Therefore, the radio wave concentrates on the stacked dishes without spreading wide and is able to supply power to two or three dishes. If a plurality of ID-tags receive power and transmit data simultaneously, the portable reader-writer 13 cannot handle such data simultaneously. So, if signals are received from a plurality of dishes simultaneously or substantially simultaneously, the portable reader-writer 13 detects the ID number of the signal, first received and send a signal back designating that ID number. When plural ID-tags receive the designated ID number, they compare it with their own ID number which is stored in the MPU 8, and only one ID-tag corresponding to the designated ID number sends the data to the portable reader-writer 13. Other ID-tags do not send the data. Thus, the portable reader-writer 13 communicates with one ID-tag at a time and communicates with other ID-tags later one by one.

When the ID-tag has completed its data communication with the portable reader-writer 13, the MPU 8 of the ID-tag turns off the relay 5 at step S5 so that power supply from the portable reader-writer 13 is terminated. Once the relay 5 is turned off, that state is kept for a predetermined period of time by electric charge stored in the condenser of the smoothing circuit 7. After the lapse of the predetermined period of time, the relay 5 returns to the normally ON state. The period of time during which the relay 5 is kept turned off is selected so that it is sufficient to complete communication with all the dishes stacked. Since power supply to the ID tag which completed communication is turned off, sufficient power is supplied to other ID-tags one by one.

Turning to step S3 in FIG. 5 again, if the answer at step 53 is "no," i.e., the command received is the single-write or the single-read command, then the routine moves to step S6 where the MPU 8 functions in accordance with the command received and moves back to step S2. The single-write and single-read commands are sent from the stationary controller to the dishes 1 moving on the conveyer, and power supply to the ID-tags is automatically discontinued as the dishes move away from a communication zone. Therefore, it is not necessary to turn off the relay 5.

Figure 6:
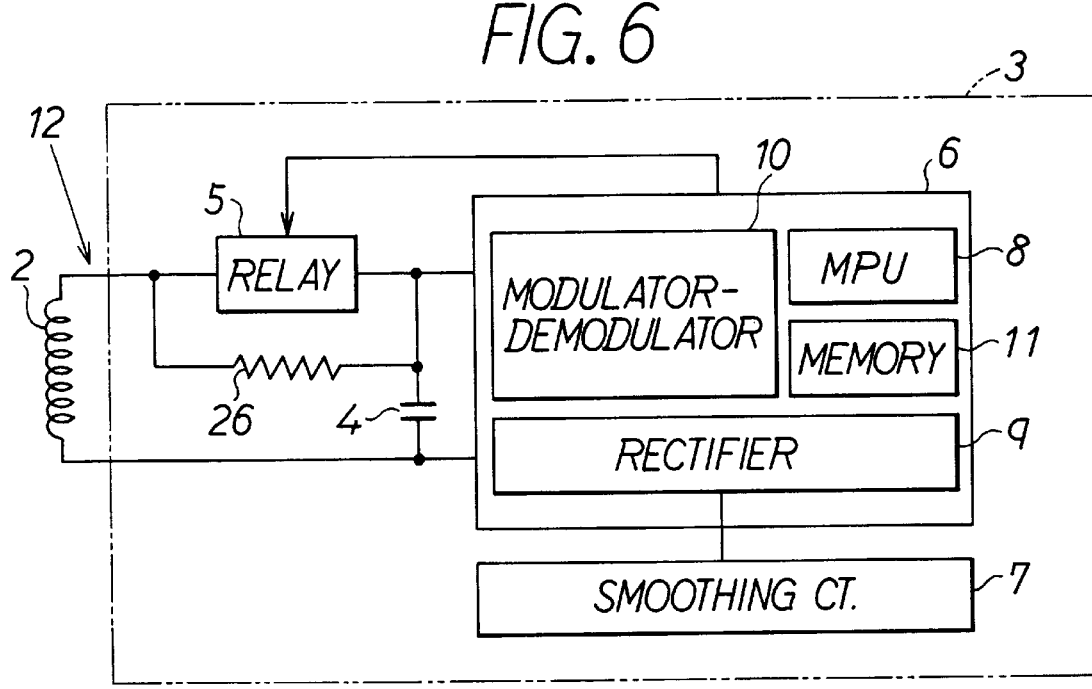
FIG. 6 is a block diagram showing circuits and components contained in an ID-tag, as a modified form of the first embodiment according to the present invention.

Referring to FIG. 6, a modified form of the first embodiment will be described. In this modification, a resistor 26 is connected to the relay 5 in parallel. Other structures are the same as those of the first embodiment. When the relay 5 is turned off, the resonant circuit 12 is not completely open and small amount of current flows through the resonant circuit 12, thereby continuing power supply in a small amount. The small amount of power is selected so that it does not interfere with power supply to other ID-tags stacked together. In addition, even when the relay 5 is turned off, small power continuously supplied is able to keep the relay 5 turned off.

Figure 7:
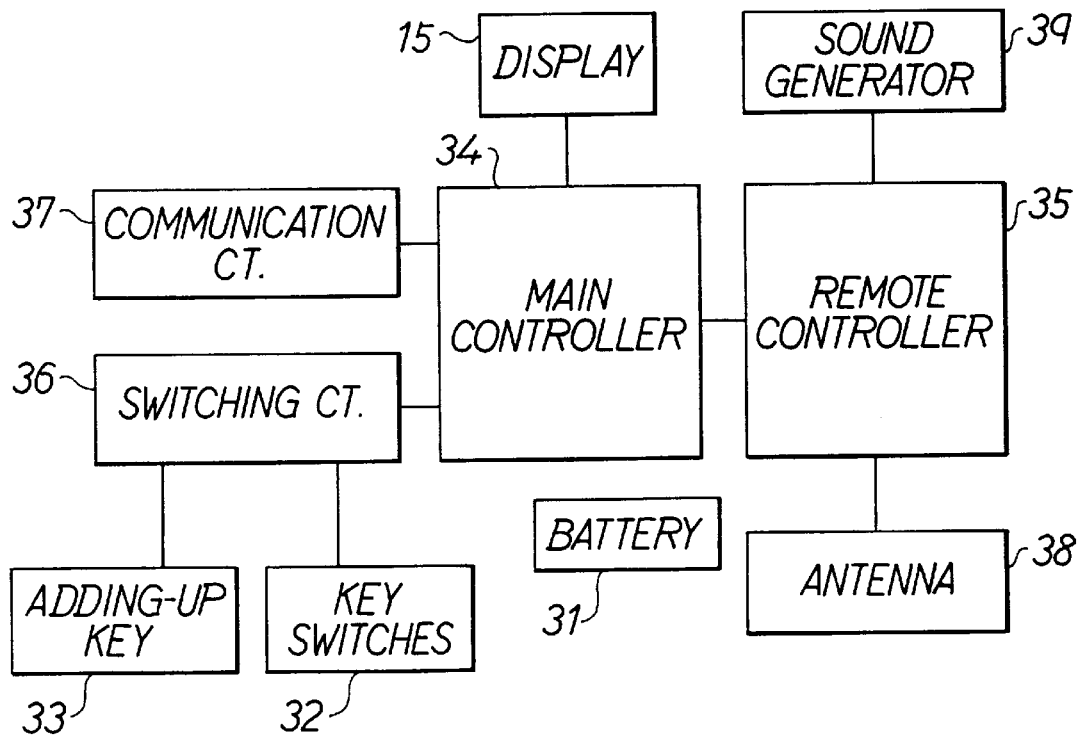
FIG. 7 is a block diagram showing electronic circuits contained in the portable reader-writer as a second embodiment according to the present invention.

A second embodiment of the present invention will be described referring to FIGS. 7–11. In this embodiment, the portable reader-writer 13 is modified so that it can indicate whether the communication with all the stacked dishes 1 is completed or not. The portable reader-writer 13 includes a main controller 34 and a remote controller portion 35 as shown in FIG. 7. Key switches 32 and an adding-up key 33 are connected to the main controller 34 through a switching circuit 36. A communication circuit 37 for communicating with the stationary controller and the display window 15 are also connected to the main controller 34. An antenna portion 38 and a sound generator 39 such as a buzzer are connected to the remote controller portion 35. The switching circuit 36 sends signals to the main controller 34 according to operation of the key switches 32 and the adding-up key 33. A battery 31 is also included in the portable reader-writer 13.

Figure 8:
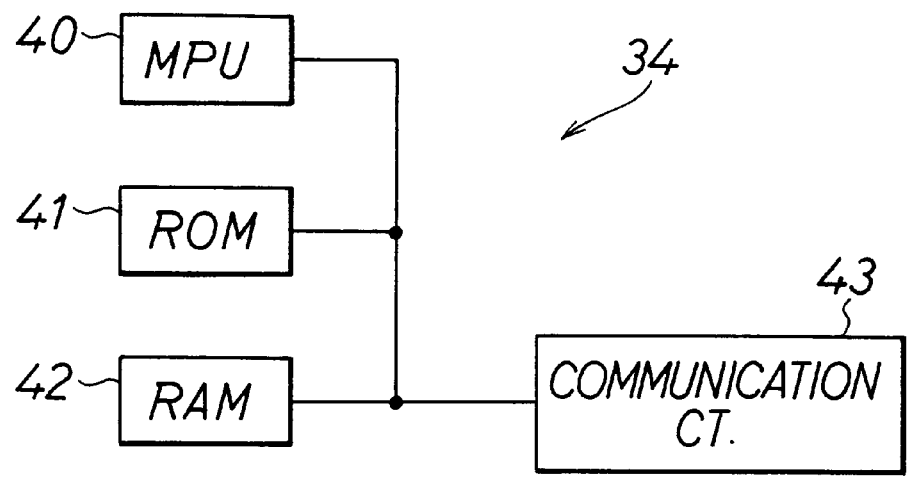
FIG. 8 is a block diagram showing a main controller of the portable reader-writer shown in FIG. 7.
Figure 9:
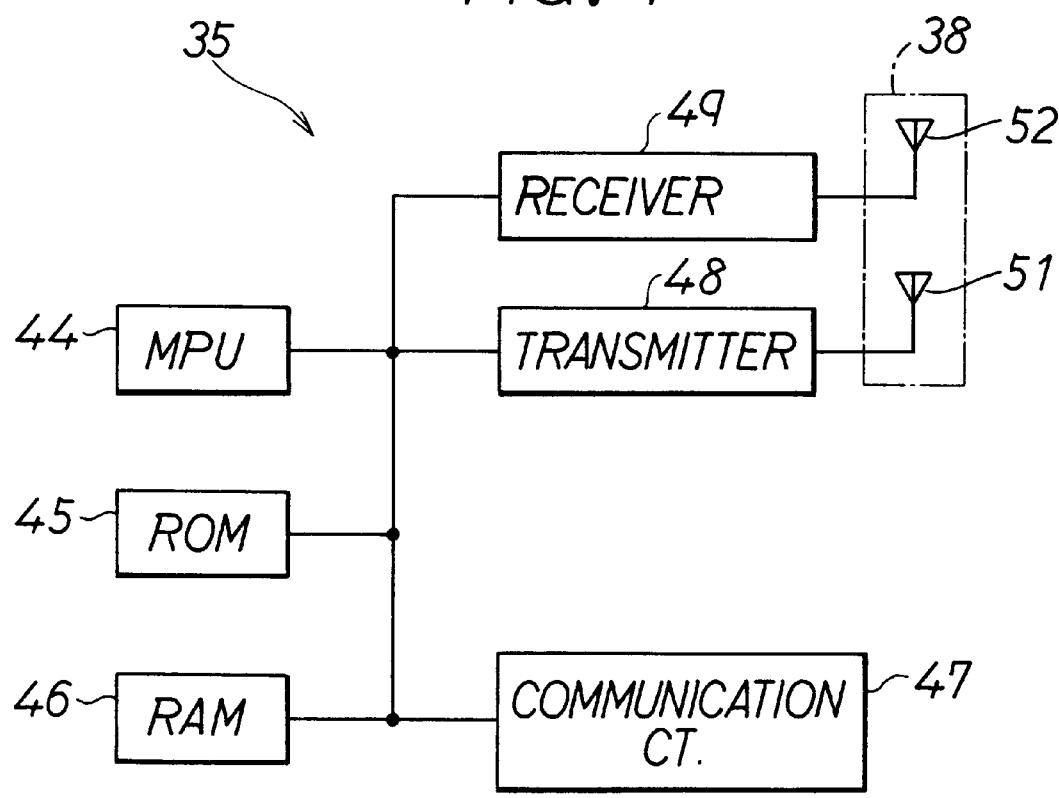
FIG. 9 is a block diagram showing a remote controller portion of the portable reader-writer shown in FIG. 7.

FIG. 8 shows components included in the main controller 34. It includes an MPU 40, a ROM 41, a RAM 42 and a communication circuit 43. FIG. 9 shows components included in the remote control portion 35. It includes an MPU 44, a ROM 45, a RAM 46, a receiver 49 connected to a receiving antenna 52, a transmitter 48 connected to a transmitting antenna 51 and a communication circuit 47. The main controller 34 and the remote controller portion 35 communicate with each other through the respective communication circuits 43 and 47. The MPU 40 of the main controller 34 processes data and controls other components connected thereto, i.e., it processes data according to signals sent from the switching circuit 36 and the remote controller portion 35, and controls the display window 15 to display a function being performed and results of calculation.

The MPU 44 of the remote controller portion 35 controls communication with the ID-tag 3 and operation of the sound generator 39. To communicate with the ID-tag 3, the transmitter 48 modulates the carrier signal to generate a power supply radio wave which is in turn transmitted from the transmitting antenna 51. Then, data to be transmitted are modulated in the transmitter 48 so that the data are superimposed on the radio wave for power supply. The data superimposed are transmitted from the transmitting antenna 51. On the other hand, the radio wave transmitted from the ID-tag is received by the receiving antenna 52 and demodulated by the receiver 49 into data signals. The data signals are once stored in the RAM 46 and then sent to the main controller 34 through the communication circuit 47. The remote controller portion 35 controls the sound generator 39 so that the sound generator 39 gives off a beep sound during a period in which the portable reader-writer 13 is communicating with the ID-tags under the multi-read mode.

Figure 10:
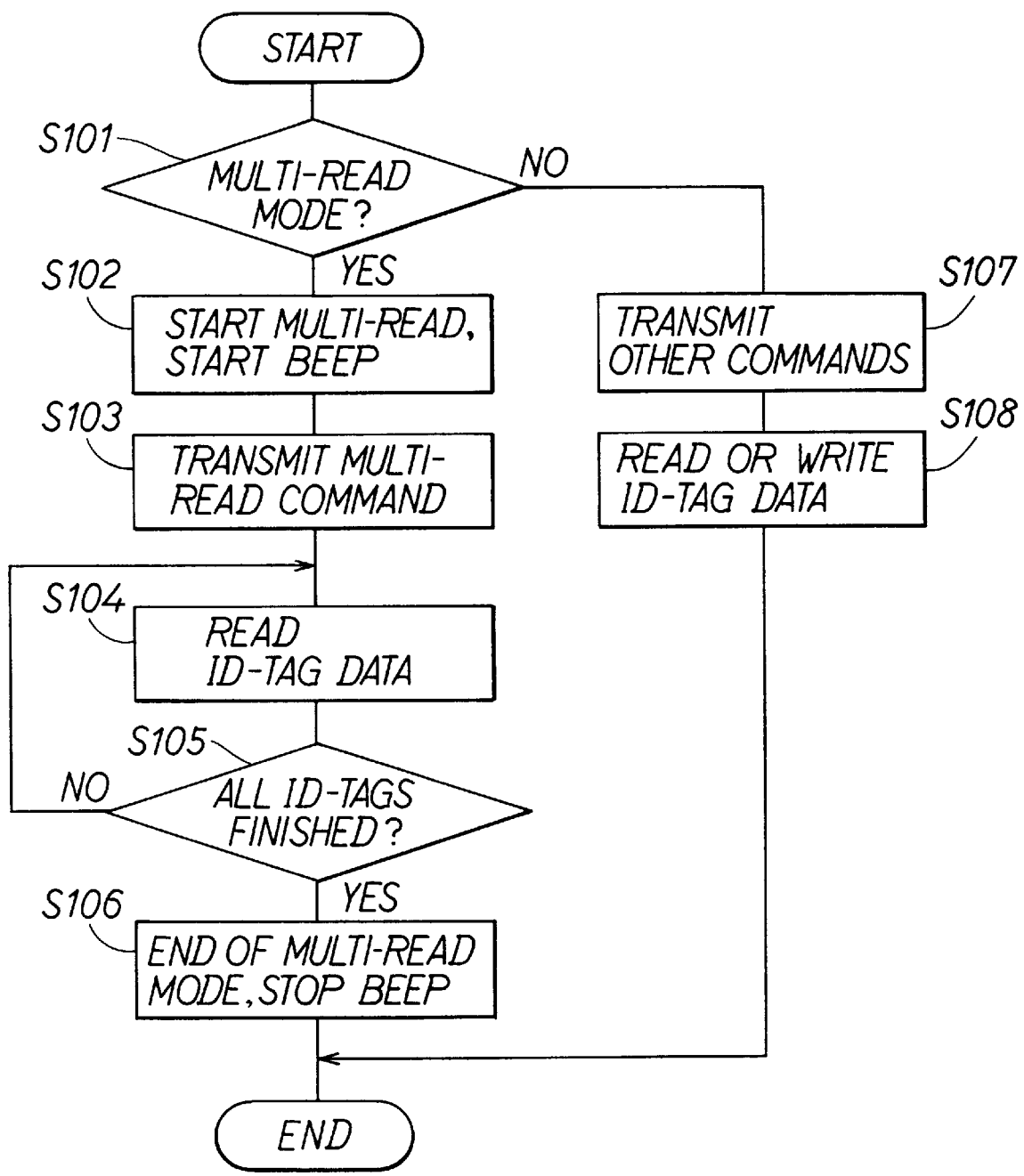
FIG. 10 is a flowchart showing a communication process between the ID-tag and the remote controller shown in FIG. 7.

The communication process will be described, referring to a flowchart in FIG. 10. The dishes 1, in each of which an ID-tag 3 is embedded, are stacked at a side of a customer who finished his (or her) meal. A radio wave signal from the portable reader-writer 13 is transmitted, upon operation of the adding-up key 33, toward the stack of dishes to calculate an amount of bill to be charged to the customer. Since this signal is sent under the multi-read mode, the answer of step S101 in FIG. 10 is affirmative. Then, the routine moves to step S102. At step S102, the MPU 40 in the main controller 43 sends a command to the remote controller portion 35 to start reading the data of ID-tags under the multi-mode. The MPU 44 of the remote controller portion 35 starts the multi-read mode communication. The radio wave for supplying power to the ID-tags is transmitted, and the sound generator 39 is driven at the same time. The sound generator 39 gives off the beep sound, and the attendant holding the portable reader-writer 13 is notified that the communication for calculating the bill is started. The beep sound continues until the communication with all the dishes is completed. So, the attendant holds the portable reader-writer so that it aims at the stack of the dishes until the beep sound ends.

Then, at step 103, the multi-read command signal is transmitted. The data on ID-tags are read and transmitted to the portable reader-writer 13 at step S104 in the similar manner as in the first embodiment. Each ID-tag is read one by one until all the ID-tags are read, repeating step S104 and S105. When all the ID-tags are read, the answer from step S105 turns to "YES," then the communication under the multi-read mode is terminated and the beep sound stops at step S106.

The judgment as to whether all the ID-tags are read is performed in the following manner. As shown in an uppermost time chart in FIG. 11, the MPU 44 of the remote controller portion 35 transmits the multi-read command repeatedly at equal intervals, each of which is divided into ten time-slots, for example. When an ID-tag receives the command, it sends back a signal at timing corresponding to its own ID number. For example, let's assume there are three ID-tags, a tag 3a having ID number 121, a tag 3b having ID number 132 and a tag 3c having ID number 142. When these ID-tags receive the first command, each ID-tag sends back a signal at a time-slot corresponding to the first digit of its own ID number. That is, as shown in the time charts in FIG. 11, the ID-tag 3a sends the signal at the first time-slot because its first digit is 1, the ID-tag 3b at the second time-slot because its first digit is 2, and the ID-tag 3c at the second time-slot because its first digit is also 2. Because there is only one signal sent back from the ID-tag 3a at the first time-slot, the signal is successfully received by the portable reader-writer 13, and the ID-tag 3a receives an answer-back. However, because there are two signals sent back from the ID-tags 3b, 3c at the second time-slot, two signals collide and those are not received by the portable reader-writer 13. When the second command signal is received by the ID-tags 3b, 3c, the ID-tags send back signals at time-slots corresponding to the second digit of their own ID numbers, respectively. That is, the ID-tag 3b sends back a signal at the third time-slot after the second command signal because the second digit of its identification number is 3, and the ID-tag 3c at the fourth time-slot because its second digit is 4. Because there is only one response signal in each time-srt this time, those response signals-from the ID-tags 3b, 3c are received by the portable reader-writer 13. Both ID-tags 3b, 3c receive answer-back signals from the portable reader-writer 13, respectively. This means that the responses from the ID-tags 3b, 3c which have failed after the first command signal are successfully completed after the second command signal. Then, the third command signal is transmitted from the portable reader-writer 13. Because all the ID-tags 3a, 3b, 3c have already received the answer-back signals, they do not respond to the third command signal. Therefore, the portable reader-writer 13 receives no response signal after the third command signal is transmitted, and, accordingly, it judges that the communication with all the ID-tags have been completed.

Turning to the flowchart in FIG. 10 again, if it is judged at step S101 that the command signal is not the multi-read command, i.e., the command signal is either single-read or single-write command, then the routine moves to S107 and then to S108. The remote controller portion 35 transmits the single-read or single-write command to the ID-tag at step S107 and communicates with the particular ID-tag to read or write data on the ID-tag.

As described above, the portable reader-writer 13 as the second embodiment gives off the beep sound during the period in which the communication with the ID-tags under the multi-read mode is being carried out. Therefore, the attendant is informed that the communication is going on and holds the portable reader-writer 13 toward the stacked dishes until the beep sound is terminated. Accordingly, the data on all ID-tags can be read without fail.

Application of the present invention is not limited to the bill calculation at sushi bar, but it may be applied to other situations where the ID-tags are stacked together or placed closely to one another. For example, the ID-tags may be attached to clothes stacked together at a depot. The relay 5 shown in FIGS. 1 and 6 may be constituted by a semiconductor element such as a transistor or thyristor. The sound generator 39 shown in FIG. 7 may be replaced by a device showing a visual signal such as a light emitting diode. Also, the sign indicating that the portable reader-writer 13 is communicating with the ID-tags may be displayed on the display window 15, in addition to or in place of the beep sound from the sound generator 39.

While the present invention has been shown and described with reference to the foregoing preferred embodiments, it will be apparent to those skilled in the art that changes in form and detail may be made therein without departing from the scope of the invention as defined in the appended claims.

What is claimed is:

1. An identification tag for wireless communication with a remote controller comprising:

means for receiving electric power for operating the identification tag, the electric power being wirelessly supplied from the remote controller; and a switching member for substantially discontinuing receipt of the electric power when communication with the remote controller is completed.

2. The identification tag as in claim 1, wherein:

the electric power receiving means includes a resonant circuit having a coil and a condenser connected in series.

3. The identification tag as in claim 2, wherein:

the switching member is a relay connected in series with the resonant circuit, the relay being opened when the communication with the remote controller is completed.

4. The identification tag as in claim 3, wherein:

the relay is kept open for a predetermined period of time after it has been opened.

5. The identification tag as in claim 4, wherein:

the relay is a normally closed contactless relay.

6. The identification tag as in claim 2, wherein:

the switching member is a semiconductor switch connected in series with the resonant circuit, the semiconductor switch being brought into a high impedance state when the communication with the remote controller is completed.

7. The identification tag as in claim 6, wherein:

the semiconductor switch is kept in the high impedance state for a predetermined period of time after it has been brought into the high impedance state.

8. The identification tag as in claim 7, wherein:
the semiconductor switch is a transistor.

9. The identification tag as in claim 1, wherein:

the electric power receiving means includes an antenna for receiving the electric power transmitted from the remote controller; and the antenna also functions as an antenna for wireless communication between the identification tag and the remote controller.

10. The identification tag as in claim 9, wherein:
the antenna is, a coil antenna.

11. The identification tag as in claim 2, wherein:

the switching member is a circuit connected in series with the resonant circuit, the circuit having switching means and a resistor connected in parallel with each other.

12. The identification tag as in claim 1, wherein: the identification tag is used for articles stacked together, one identification tag being embedded in or attached to each article.

13. The identification tag as in claim 1, wherein:

the remote controller wirelessly communicates with a plurality of identification tags located in its communication zone;

the communication includes communication under a multi-read mode; and the remote controller includes an indicator for indicating that the remote controller is communicating with the identification tags under the multi-read mode.

14. The identification tag as in claim 13, wherein:

the indicator comprises means for detecting that the communication under the multi-read mode has not been performed for a predetermined period of time; and the indicator discontinues operation thereof when such is detected by the detecting means.

* * * * *